United States Patent
Weston et al.

(10) Patent No.: US 11,731,640 B2
(45) Date of Patent: Aug. 22, 2023

(54) ENERGY SAVING TRACTION AND STABILITY CONTROL

(71) Applicant: FORD GLOBAL TECHNOLOGIES, LLC, Dearborn, MI (US)

(72) Inventors: Keith Weston, Canton, MI (US); Brendan F. Diamond, Grosse Pointe, MI (US); Ryan O'Rourke, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 17/169,815

(22) Filed: Feb. 8, 2021

(65) Prior Publication Data
US 2022/0250634 A1    Aug. 11, 2022

(51) Int. Cl.
| | | |
|---|---|---|
| *B60W 50/038* | (2012.01) | |
| *B60W 50/10* | (2012.01) | |
| *H04W 4/46* | (2018.01) | |
| *B60W 10/11* | (2012.01) | |

(52) U.S. Cl.
CPC .......... *B60W 50/038* (2013.01); *B60W 10/11* (2013.01); *B60W 50/10* (2013.01); *H04W 4/46* (2018.02); *B60W 2510/083* (2013.01); *B60W 2510/105* (2013.01)

(58) Field of Classification Search
None
See application file for complete search history.

(56) References Cited

U.S. PATENT DOCUMENTS

| | | | |
|---|---|---|---|
| 5,740,044 A | 4/1998 | Enrenhardt et al. | |
| 10,528,047 B1* | 1/2020 | Trujillo | G06V 10/764 |
| 10,762,791 B2* | 9/2020 | Switkes | H04W 4/023 |
| 2005/0060076 A1* | 3/2005 | Phillips | B60L 8/003 |
| | | | 701/53 |
| 2009/0118928 A1* | 5/2009 | Heap | B60K 6/547 |
| | | | 477/3 |
| 2011/0106388 A1* | 5/2011 | Boeckenhoff | B60W 10/06 |
| | | | 701/70 |
| 2016/0288789 A1* | 10/2016 | Durgin | B60W 20/00 |
| 2018/0188744 A1* | 7/2018 | Switkes | G05D 1/0088 |
| 2018/0300566 A1* | 10/2018 | Qin | G06V 20/584 |
| 2019/0077258 A1* | 3/2019 | Cho | B60K 6/52 |
| 2019/0232957 A1* | 8/2019 | Frazzoli | B60W 10/184 |
| 2020/0010089 A1* | 1/2020 | Ford | B60W 10/10 |
| 2020/0269702 A1* | 8/2020 | Meyer | B60L 50/15 |
| 2021/0197778 A1* | 7/2021 | Shi | B60T 8/1761 |
| 2021/0229646 A1* | 7/2021 | Kim | B60T 8/3215 |
| 2021/0394738 A1* | 12/2021 | Cho | B60W 40/114 |
| 2022/0242386 A1* | 8/2022 | Yorke | B60W 30/18018 |
| 2022/0266846 A1* | 8/2022 | Nose | B60W 50/12 |

* cited by examiner

*Primary Examiner* — Jonathan M Dager
(74) *Attorney, Agent, or Firm* — Joseph M. Zane; Brooks Kushman P.C.

(57) ABSTRACT

Controlling maximum appliable positive and negative torque for a vehicle is provided. Vehicle data indictive of a driver torque request is received. Maximum appliable positive and negative torques for the vehicle are estimated. Responsive to the driver torque request being positive, the driver torque request is limited to the maximum appliable positive torque. Responsive to the driver torque request being negative, the driver torque request is limited to the maximum appliable negative torque.

18 Claims, 2 Drawing Sheets

ENERGY SAVING TRACTION AND STABILITY CONTROL

TECHNICAL FIELD

Aspects of the present disclosure generally relate to energy saving traction and stability control.

BACKGROUND

Vehicles can allow a driver to apply excess torque, resulting in wheel slip. To avoid such an occurrence, the vehicle may include a stability control and traction control system. These systems determine that the wheel is slipping, and if so, apply the brakes to reduce available torque to mitigate wheel slip.

SUMMARY

In one or more illustrative examples, a vehicle for controlling maximum appliable positive and negative torque is provided. The vehicle includes a controller having a hardware processor. The controller is programmed to receive vehicle data indictive of a driver torque request; estimate maximum appliable positive and negative torques for the vehicle; responsive to the driver torque request being positive, limit the driver torque request to the maximum appliable positive torque; and responsive to the driver torque request being negative, limit the driver torque request to the maximum appliable negative torque.

In one or more illustrative examples, a method for controlling maximum appliable positive and negative torque for a vehicle is provided. Vehicle data indictive of a driver torque request is received. Maximum appliable positive and negative torques for the vehicle are estimated. Responsive to the driver torque request being positive, the driver torque request is limited to the maximum appliable positive torque. Responsive to the driver torque request being negative, the driver torque request is limited to the maximum appliable negative torque.

In one or more illustrative examples, a non-transitory computer readable medium includes instructions that, when executed by a controller of a vehicle includes both an electric motor and an internal combustion engine, cause the controller to estimate maximum appliable positive and negative torques for the electric motor; estimate maximum appliable positive and negative torques for the internal combustion engine, the maximum appliable positive and negative torques for the internal combustion engine differing from the maximum appliable positive and negative torques for the electric motor; allocate the driver torque request in part to the electric motor and in part to the internal combustion engine; responsive to the driver torque request for the electric motor being positive, limit the driver torque request to the maximum appliable positive torque for the electric motor; responsive to the driver torque request for the electric motor being negative, limit the driver torque request to the maximum appliable negative torque for the electric motor; responsive to the driver torque request for the internal combustion engine being positive, limit the driver torque request to the maximum appliable positive torque for the internal combustion engine; and responsive to the driver torque request for the internal combustion engine being negative, limit the driver torque request to the maximum appliable negative torque for the internal combustion engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Allowing wheel slip results in wear and/or deterioration of component parts. Moreover, mitigating wheel slip with brake application turns energy into heat, which may also be undesirable. An improved stability/traction control system may use acceleration vs. torque demand to determine a maximum torque that can be applied at the tire contact patch. The system may derate (i.e., reduce the power rating of) the powertrain output to limit torque to that which will obtain the maximum vehicle acceleration without wheel slip. This may accordingly reduce wear on components such as tires and brakes, reduce energy consumption (fuel/battery), and reduce wear on roadways.

The system may also feed data back to the vehicle manufacturer to aid in product development and customer communication. This data may be shared via vehicle-to-vehicle (V2V) communication and subscription services (to generate revenue) to provide coefficient of friction ($\mu$) data with respect to the vehicle in front of the ego vehicle. This may also enable predictive and/or proactive traction management. Further aspects of the disclosure are discussed in detail herein.

Figure 1:
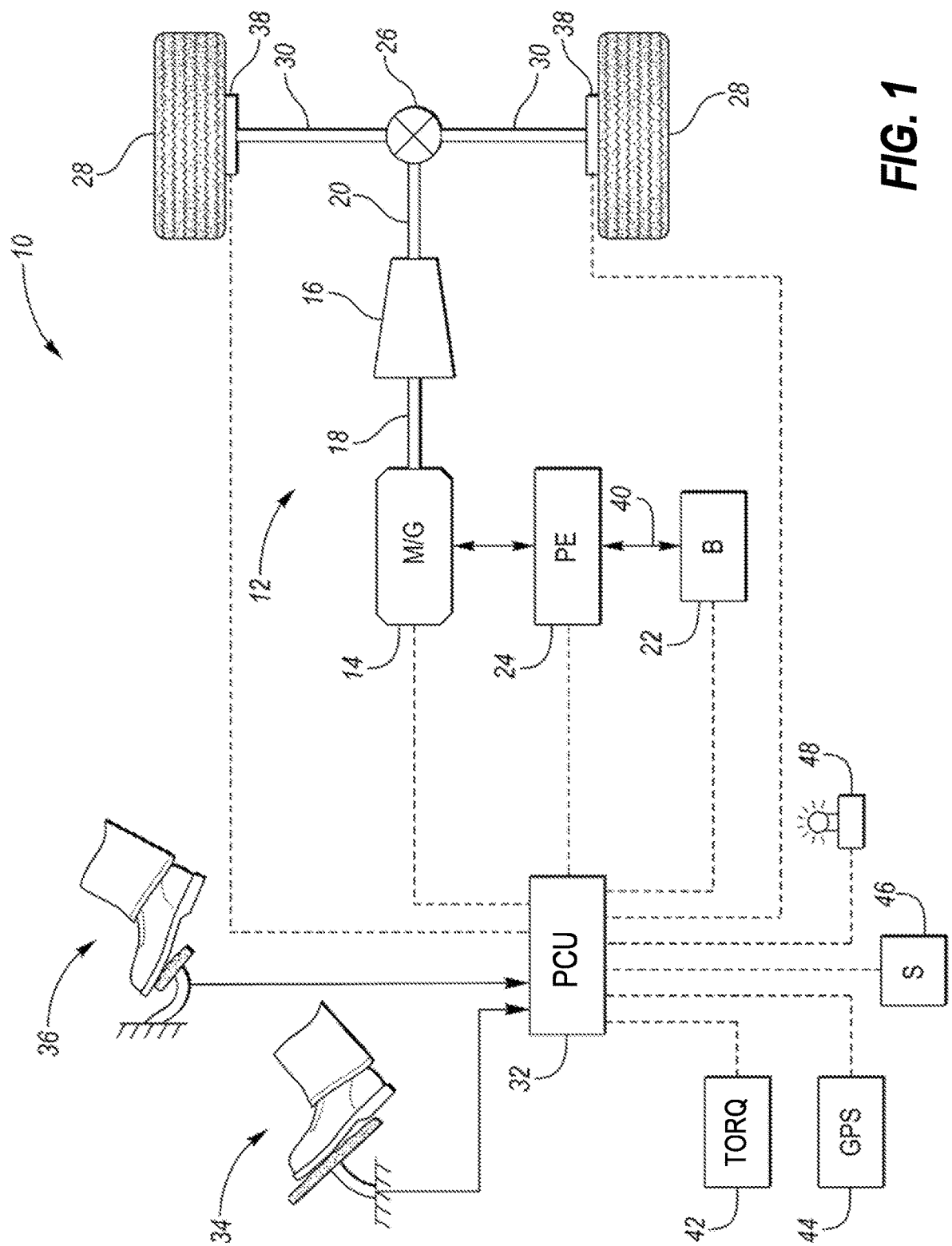
FIG. 1 illustrates a schematic diagram of an electric vehicle configured for controlling maximum appliable positive and negative torque.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in FIG. 1, the controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16).

Various functions or components may be controlled by the controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14 and/or to the friction brakes 38. The controller 32 also controls the timing of gear shifts within the transmission 16. Releasing the accelerator pedal 34 and/or applying the brake pedal 36 may also generate a regenerative braking command to utilize the M/G 14 to recharge the battery 22.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas-powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

The vehicle 10 may include a torque controller 42. The torque controller 42 may be a part of controller 32 or may be a separate controller that communicates with controller 32. The torque controller 42 may include torque mapping and/or limiting functionality that may be used to control the maximum torque that is available to be provided by the powertrain 12.

The position of the vehicle relative to the map data stored to the torque controller 42 may be determined via a global positing system (GPS) 44. The GPS 44 may be a part of controller 32 or may be a separate module that communicates with controller 32. The torque controller 42 and the GPS 44 may each include a microprocessor, memory storage, and/or any other attribute described with respect to controller 32 herein.

Information may be received via vehicle-to-vehicle (V2V) communication (i.e., data transmitted and received from other vehicles), vehicle-to-infrastructure (V2I) communication (i.e., data transmitted and received from the roadway infrastructure), vehicle-to-everything (V2X) communication (i.e., data transmitted and received from any source), virtual-to-physical (V2P) data, (i.e., data that is based on a virtual model), radio transmissions (e.g., AM, FM, or Satellite digital audio radio service), vehicle sensors 46 (e.g., radar, lidar, sonar, cameras, etc.), a traffic information server, etc. The vehicle 10 sensors 46 may be configured to communicate with the controller 32 and may be utilized to detect conditions external to and/or proximate the vehicle 10 such as traffic conditions (e.g., traffic volume or density), proximity of other vehicles, weather conditions (e.g., rain or snow), traction conditions, (e.g., coefficient of friction ($\mu$) of the vehicle 10 to the road), etc. The vehicle may include a receiver 48 that is configured to communicate wirelessly received data (e.g., V2V data, V2I data, V2X data, etc.) to the controller 32. The wirelessly received data may also include conditions external to and/or proximate the vehicle 10.

The torque controller 42 may superimpose the dynamic data or information (e.g., traffic or weather data) over the static data or information (e.g., map data and route attribute data) to predict vehicle events such as, acceleration, deceleration, coasting, etc., in the horizon (i.e., the predetermined distance in front of the vehicle 10 on the current route the vehicle is traveling on) along the route. Such predictions of vehicle events such as, acceleration, deceleration, coasting, etc., allows further predictions of vehicle speed, load from the road grade, thermal loads on the vehicle 10 (or vehicle subcomponents), $\mu$ of the road surface (which may be affected by weather or conditions such as flooding or road spills), and other attributes (e.g., presence of stop signs, traffic lights, change in speed limits, climate demand, Road curvature, speed and acceleration of other vehicles, construction, etc.) that could be used to predict the maximum torque that may be provided by the vehicle 10 to the ground.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

It should also be understood that the vehicle configuration described herein is merely exemplary and is not intended to be limited. Other hybrid or electric vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell vehicles, battery operated electric vehicles (BEVs), or any other vehicle configuration known to a person of ordinary skill in the art.

Figure 2:
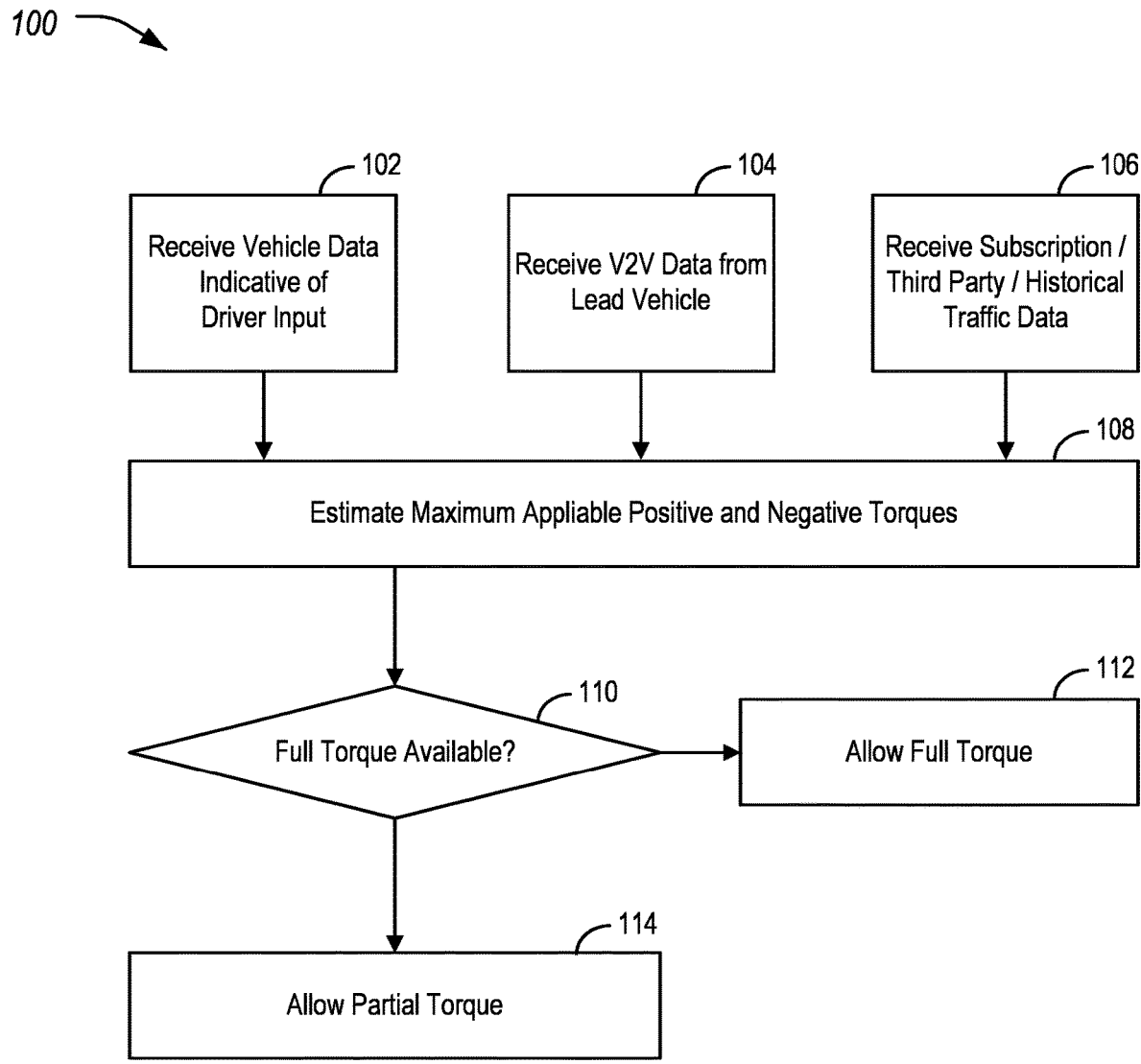
FIG. 2, a flowchart of a method for controlling maximum appliable positive and negative torque.

Referring to FIG. 2, a flowchart of a method 100 for controlling maximum appliable positive and negative torque is illustrated. The method 100 may be stored as control logic and/or an algorithm within the controller 32. The controller 32 may implement the method 100 by controlling the various components of the vehicle 10. While shown linearly, the method 100 may be performed continuously in a loop-wise manner during the time that the vehicle is in a motive mode.

At operation 102, the vehicle 10 receives vehicle data indicative of driver input. For instance, the driver may use the accelerator pedal 34 to provide a demanded torque, power, or drive command to the powertrain 12 and/or the driver may use the brake pedal 36 to provide a demanded braking torque to slow the vehicle 10. Based upon inputs from the accelerator pedal 34 and brake pedal 36, the controller 32 commands the torque and/or power to the M/G 14, and friction brakes 38. It should be noted that the demanded torque may be positive or negative. In some setups, one-pedal driving may be provided, in which the driver may press the accelerator pedal 34 to demand positive torque and may let up on the accelerator pedal 34 to demand a negative torque, e.g., via regenerative braking.

At operation 104, the vehicle 10 receives V2V data from a lead vehicle. For instance, location, speed, coefficient of friction (μ), etc. data from other vehicles in front of the vehicle 10 may be used to define a limit in the desired speed or acceleration of the vehicle 10. (It should be noted that the vehicle 10 may correspondingly provide such V2V information to vehicles behind the vehicle 10, when such other vehicles are performing the method 100.)

At operation 106, the vehicle 10 receives subscription data, third-party data from other vehicles 10, and/or historical traffic data. For instance, the subscription data or cloud data may include data with respect to weather conditions, data with respect to the maximum appliable torque for other vehicles 10 currently traversing the same segment of roadway being traversed by the vehicle 10, data with respect to the maximum appliable torque for vehicles 10 having previously traversed the same segment of roadway being traversed by the vehicle 10, etc.

At operation 108, the vehicle 10 estimates the maximum appliable torque that may be applied by the vehicle 10 to the ground. This estimate may be based on the data received at operations 102, 104, and/or 106. Generally, the maximum tractive torque a wheel can transmit is equal to the normal load times the friction coefficient between the wheel and the ground times the radius of the drive wheel.

Using the received data, a computation may be performed for the wheels using factors such as vehicle weight distribution, normal force on each tire, estimated tire mu, tire width, tire aspect ratio, real time data on road conditions (e.g., rain, ice, snow, ambient temperature, etc.), FDR, current gear ratio, and other relevant factors or component specifications. Overall tractive capability can be estimated by measuring normal force at the tire contact patch and accounting for powertrain efficiency, motor(s) torque, wheel slip, and the surface friction coefficient. Normal force on each wheel end is dependent on factors such as weight, loading, center of gravity, trackwidth/wheelbase, and acceleration. Dynamic changes in normal force can be calculated as needed.

This estimate of maximum appliable torque may account for vehicle loading. Vehicle loading adds weight to the vehicle 10 and increases resulting normal force. Higher normal force for the same surface friction coefficient on a flat homogenous surface will allow for higher tractive capability. For instance, payload or tongue weight add weight directly to the vehicle 10 and increases normal force. A combination of vehicle 10 (trailer and tow vehicle 10) weight can also be used to determine how much regenerative/friction braking to apply when going down grade. Vehicle weight, payload, and tongue weight can be determined/estimated by using on-board scales or measuring suspension articulation, or other relevant methods.

This estimate of maximum appliable torque may account for vehicle metrics. For instance, weight distribution may determine how much weight is essentially being carried at each wheel end. This may inform vehicle 10 of normal force on each wheel either through estimation or direct measurement. Normal force on each wheel end is dependent on factors such as vehicle 10 weight, loading, center of gravity of the vehicle 10, vehicle 10 dimensions for trackwidth and/or wheelbase and vehicle 10 acceleration. Dynamic changes in normal force may be accounted for as needed.

This estimate of maximum appliable torque may account for traction factors as well. These factors may include road metrics (e.g., grade, surface type (asphalt, concrete, gravel), tire composition (different tire compounds have different amounts of frictional force that can be generated), and tire temperature (tire and ambient temperature may affect ability of frictional force to be generated based on tire compound). Understanding longitudinal and lateral force characteristics of tires, in propulsion and braking, vs vertical force (normal force) based on slip ratio may accordingly aid in the computation of maximum appliable torque.

This estimate of maximum appliable torque may account for vehicle metrics powertrain architecture. Powertrain, including drive type (RWD/AWD/etc.), may determine which wheels can apply torque and which cannot (the more axles for torque application equals higher propulsion and regenerative torque capability). In a BEV/hybrid motor configuration—dual, tri, and quad (and more depending on number of wheels/axles) may allow for torque application on multiple sets of tires allowing for increased tractive capability. If multiple motors are used on a single axle, this may help allow for torque vectoring during turns. Motor torque/power bias may also be accounted for as a rear drive unit might be more powerful than front drive unit (or vice versa). Regarding a transmission, it may be accounted for whether a single or step gear transmission is being used as well as whether a torque converter type and lockup clutch is used.

As torque application is inherently different due to the set-up of the powertrain architecture of the vehicle 10, the maximum appliable torque may vary based on the powertrain architecture. For instance, the maximum appliable torque computation may be adjected based on whether the torque is applied from the powertrain 12 to the wheels through two electric motors each driving different axles, a single electric motor driving multiple axles, an internal-combustion engine driving one axle and an electric motor or motors driving another axle, whether hub motors are used, etc.

It should also be noted that the maximum appliable torque may vary based on the drivetrain settings of the vehicle 10. For instance, the maximum appliable torque may differ if the same drivetrain is in a two-wheel drive mode (e.g., front-wheel drive, rear-wheel drive) as compared to a four-wheel drive mode (e.g., all-wheel drive). As another possibility, the maximum appliable torque may differ if the same drivetrain is in a low gear mode as compared to a standard gear mode.

For a BEV/Hybrid, derating strategies may account for the torque source. For example, all other things being equal, an ICE and an electric motor in the same vehicle could be derated differently under a torque management strategy for a given environmental conditions. By applying this concept, the derate could be applied to different torque sources differently to optimize overall vehicle performance (engine derate 10%, electric motor one derate 20%, etc.).

It should further be noted that both maximum appliable positive torque and maximum appliable negative torque may be computed. For instance, a maximum appliable positive torque may be computed for acceleration, and a maximum appliable negative torque may be computed for regen or braking.

At operation 110, the vehicle 10 determines whether full toque is available. For instance, the vehicle 10 may compare the maximum appliable torque to the maximum available torque from the powertrain 12. If the maximum appliable torque exceeds the maximum available torque, control passes to operation 112 to allow for the application of full available torque. It not, then control passes to operation 114 to 112 to allow for the application of torque up to the maximum appliable torque. After operations 112 or 114, a cycle of the method 100 ends. It should be noted that in many examples, the method 100 is iterative and may continually execute in a loop.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle, having a drivetrain including both an electric motor and an internal combustion engine, for controlling maximum appliable positive and negative torque comprising:
   a controller having a hardware processor, programmed to:
      receive vehicle data indictive of a driver torque request;
      estimate maximum appliable positive and negative torques for the electric motor;
      estimate maximum applicable positive and negative torques for the internal combustion engine, the maximum appliable positive and negative torques for the internal combustion engine differing from the maximum appliable positive and negative torques for the electric motor;
      allocate the driver torque request in part to the electric motor and in part to the internal combustion engine;
      responsive to the driver torque request for the electric motor being positive, limit the driver torque request to the maximum appliable positive torque for the electric motor;
      responsive to the driver torque request for the electric motor being negative, limit the driver torque request to the maximum appliable negative torque for the electric motor;
      responsive to the driver torque request for the internal combustion engine being positive, limit the driver torque request to the maximum appliable positive torque for the internal combustion engine; and
      responsive to the driver torque request for the internal combustion engine being negative, limit the driver torque request to the maximum appliable negative torque for the internal combustion engine.

2. The vehicle of claim 1, wherein the controller is further programmed to:
   receive vehicle-to-vehicle (V2V) data from a second vehicle in a travel direction of the vehicle; and
   adjust the maximum appliable positive and negative torques for the vehicle based on the V2V data.

3. The vehicle of claim 1, wherein the controller is further programmed to:
   identify a drivetrain setting of the vehicle; and
   adjust the maximum appliable positive and negative torques for the vehicle based on the drivetrain setting.

4. The vehicle of claim 3, wherein the drivetrain setting is whether the vehicle is in a two-wheel drive mode or in a four-wheel drive mode.

5. The vehicle of claim 3, wherein the drivetrain setting is whether the vehicle is in a low gearing mode or in a standard gearing mode.

6. The vehicle of claim 1, wherein the controller is further programmed to:
   receive subscription data from a subscription service, the subscription data including, with respect to a roadway to be traversed by the vehicle, traffic data and/or historical vehicle data; and
   adjust the maximum appliable positive and negative torques for the vehicle based on the subscription data.

7. The vehicle of claim 1, wherein the vehicle data indictive of the driver torque request is received from the vehicle operating in a one-pedal driving mode, in which pressure on an accelerator pedal is increased to demand positive torque, and the pressure on the accelerator pedal is decreased to demand negative torque.

8. The vehicle of claim 1, wherein the controller is further programmed to:
receive data indicative of current environmental conditions of the vehicle; and
derate the maximum appliable positive and negative torques for the current environmental conditions under a torque management strategy differently for the electric motor as compared to for the internal combustion engine.

9. A method for controlling maximum appliable positive and negative torque of a vehicle having a drivetrain including both an electric motor and an internal combustion engine, comprising:
receiving vehicle data indictive of a driver torque request;
estimating maximum appliable positive and negative torques for the electric motor;
estimating maximum appliable positive and negative torques for the internal combustion engine, the maximum appliable positive and negative torques for the internal combustion engine differing from the maximum appliable positive and negative torques for the electric motor;
allocating the driver torque request in part to the electric motor and in part to the internal combustion engine;
responsive to the driver torque request being positive for the electric motor, limiting the driver torque request to the maximum appliable positive torque;
responsive to the driver torque request being negative for the electric motor, limiting the driver torque request to the maximum appliable negative torque;
responsive to the driver torque request for the internal combustion engine being positive, limiting the driver torque request to the maximum appliable positive torque for the internal combustion engine; and
responsive to the driver torque request for the internal combustion engine being negative, limiting the driver torque request to the maximum appliable negative torque for the internal combustion engine.

10. The method of claim 9, further comprising:
receiving vehicle-to-vehicle (V2V) data from a second vehicle in a travel direction of the vehicle; and
adjusting the maximum appliable positive and negative torques for the vehicle based on the V2V data.

11. The method of claim 9, wherein the controller is further programmed to:
identify a drivetrain setting of the vehicle; and
adjust the maximum appliable positive and negative torques for the vehicle based on the drivetrain setting.

12. The method of claim 11, wherein the drivetrain setting is whether the vehicle is in a two-wheel drive mode or in a four-wheel drive mode.

13. The method of claim 11, wherein the drivetrain setting is whether the vehicle is in a low gearing mode or in a standard gearing mode.

14. The method of claim 9, further comprising:
receiving subscription data from a subscription service, the subscription data including, with respect to a roadway to be traversed by the vehicle, traffic data and/or historical vehicle data; and
adjusting the maximum appliable positive and negative torques for the vehicle based on the subscription data.

15. The method of claim 9, wherein the vehicle data indictive of the driver torque request is received from the vehicle operating in a one-pedal driving mode, in which pressure on an accelerator pedal is increased to demand positive torque, and the pressure on the accelerator pedal is decreased to demand negative torque.

16. The method of claim 9, further comprising:
receiving data indicative of current environmental conditions of the vehicle; and
derating the maximum appliable positive and negative torques for the current environmental conditions under a torque management strategy differently for the electric motor as compared to for the internal combustion engine.

17. A non-transitory computer readable medium comprising instructions that, when executed by a controller of a vehicle that includes a drivetrain having both an electric motor and an internal combustion engine, cause the controller to:
estimate maximum appliable positive and negative torques for the electric motor;
estimate maximum appliable positive and negative torques for the internal combustion engine, the maximum appliable positive and negative torques for the internal combustion engine differing from the maximum appliable positive and negative torques for the electric motor;
allocate a driver torque request in part to the electric motor and in part to the internal combustion engine;
responsive to the driver torque request for the electric motor being positive, limit the driver torque request to the maximum appliable positive torque for the electric motor;
responsive to the driver torque request for the electric motor being negative, limit the driver torque request to the maximum appliable negative torque for the electric motor;
responsive to the driver torque request for the internal combustion engine being positive, limit the driver torque request to the maximum appliable positive torque for the internal combustion engine; and
responsive to the driver torque request for the internal combustion engine being negative, limit the driver torque request to the maximum appliable negative torque for the internal combustion engine.

18. The medium of claim 17, further comprising instructions that, when executed by the controller of the vehicle, cause the controller to:
receive data indicative of current environmental conditions of the vehicle; and
derate the maximum appliable positive and negative torques for the current environmental conditions under a torque management strategy differently for the electric motor as compared to for the internal combustion engine.

\* \* \* \* \*